(12) United States Patent
Ross

(10) Patent No.: US 11,801,559 B2
(45) Date of Patent: Oct. 31, 2023

(54) PORTABLE PROFILER FOR LOCOMOTIVE OR RAILCAR WHEELS

(71) Applicant: HJR Real Estate Management, LLC, Escanaba, MI (US)

(72) Inventor: Harold F. Ross, Escanaba, MI (US)

(73) Assignee: HJR Real Estate Management, LLC, Escanaba, MI (US)

(*) Notice: Subject to any disclaimer, the term of this patent is extended or adjusted under 35 U.S.C. 154(b) by 0 days.

(21) Appl. No.: 17/678,563

(22) Filed: Feb. 23, 2022

(65) Prior Publication Data
US 2022/0176460 A1 Jun. 9, 2022

Related U.S. Application Data

(63) Continuation of application No. 16/273,936, filed on Feb. 12, 2019, now Pat. No. 11,426,800, which is a
(Continued)

(51) Int. Cl.
*B23B 5/32* (2006.01)
*B23B 25/06* (2006.01)
(Continued)

(52) U.S. Cl.
CPC ............. *B23B 5/32* (2013.01); *B23B 5/28* (2013.01); *B23C 3/00* (2013.01); *B23C 5/28* (2013.01);
(Continued)

(58) Field of Classification Search
CPC .... B23B 3/26; B23B 5/08; B23B 5/28; B23B 5/32; B23B 25/06; B23C 3/00;
(Continued)

(56) References Cited

U.S. PATENT DOCUMENTS

| 1,397,468 A | 11/1921 | Teas et al. |
| 1,604,962 A | 11/1926 | Benzon, Jr. |

(Continued)

FOREIGN PATENT DOCUMENTS

| DE | 3012996 A | * 10/1981 | ............... B23B 5/32 |
| EP | 0 491 067 | 6/1992 | |

(Continued)

OTHER PUBLICATIONS

Brinkmann et al., "Doppel-Unterflur-Radsatzdrehmaschine Mit Reibrollenantrieb IM DB-Werk Muenchen-Pasing Fuer Den Ice," Zeitschrift Fur Eisenbahnwesen Und Verkehrstechnik, Aug. 1, 1994, 7 pages.
(Continued)

*Primary Examiner* — Sara Addisu
(74) *Attorney, Agent, or Firm* — Foley & Lardner LLP

(57) ABSTRACT

A portable apparatus for configuring a wheel associated with a track is provided. The apparatus is in a fixed position with respect to a rail associated with the track when in operation. The apparatus includes a tool configured to engage the wheel, a position system for positioning the cutting tool in at least two axis, and a computer control. The computer control is coupled to control the positioning system. The positioning system is controlled so that the wheel is configured in accordance with a profile.

15 Claims, 14 Drawing Sheets

Related U.S. Application Data continuation-in-part of application No. 13/745,520, filed on Jan. 18, 2013, now Pat. No. 10,226,824, which is a continuation-in-part of application No. 13/587,740, filed on Aug. 16, 2012, now Pat. No. 9,358,650, and a continuation-in-part of application No. PCT/US2012/036755, filed on May 7, 2012, and a continuation-in-part of application No. 13/428,952, filed on Mar. 23, 2012, now Pat. No. 8,408,105, said application No. 13/745,520 is a continuation-in-part of application No. 12/886,418, filed on Sep. 20, 2010, now Pat. No. 8,789,448, said application No. 13/428,952 is a continuation of application No. 12/171,151, filed on Jul. 10, 2008, now Pat. No. 8,186,250.

(60) Provisional application No. 61/524,652, filed on Aug. 17, 2011, provisional application No. 61/484,562, filed on May 10, 2011.

(51) Int. Cl.
*B23B 5/28* (2006.01)
*B23C 5/28* (2006.01)
*B23C 3/00* (2006.01)

(52) U.S. Cl.
CPC .............. *Y10T 82/10* (2015.01); *Y10T 82/18* (2015.01); *Y10T 82/185* (2015.01); *Y10T 83/162* (2015.04)

(58) Field of Classification Search
CPC ....... B23Q 15/007; Y10T 82/10; Y10T 82/18; Y10T 82/185; Y10T 83/162; B61K 5/00; B61K 5/04
See application file for complete search history.

(56) References Cited

U.S. PATENT DOCUMENTS

| | | | |
|---|---|---|---|
| 2,677,307 A | 5/1954 | Bloss | |
| 3,256,754 A | 6/1966 | Rivierre et al. | |
| 3,323,397 A | 6/1967 | Ladoues | |
| 3,598,017 A * | 8/1971 | Saari | B23B 33/00 409/170 |
| 3,667,329 A | 6/1972 | Dombrowski | |
| 4,276,793 A * | 7/1981 | Wirtz | B23B 5/32 82/104 |
| 4,347,769 A | 9/1982 | Dombrowski et al. | |
| 4,802,285 A * | 2/1989 | Ligacz | G01B 7/28 33/203.11 |
| 4,939,962 A | 7/1990 | Wittkopp et al. | |
| 4,951,534 A | 8/1990 | Brinkmann et al. | |
| 5,105,691 A | 4/1992 | Brinkmann et al. | |
| 5,511,913 A | 4/1996 | Naumann | |
| 5,561,242 A | 10/1996 | Naumann et al. | |
| 5,678,963 A * | 10/1997 | Heimann | B23B 5/32 33/644 |
| 5,678,966 A | 10/1997 | Heimann | |
| 5,678,973 A | 10/1997 | Cox | |
| 5,890,554 A | 4/1999 | Sturges | |
| 5,890,854 A | 4/1999 | Naumann et al. | |
| 6,264,407 B1 | 7/2001 | Tinken | |
| 6,519,861 B1 | 2/2003 | Brueck et al. | |
| 6,769,365 B1 | 8/2004 | Ward | |
| 6,871,416 B2 | 3/2005 | Leja et al. | |
| 8,186,250 B2 | 5/2012 | Ross | |
| 8,408,105 B2 | 4/2013 | Ross | |
| 8,789,448 B2 | 7/2014 | Ross | |
| 8,806,996 B2 | 8/2014 | Cooper | |
| 2010/0005935 A1 | 1/2010 | Ross | |
| 2010/0154606 A1 | 6/2010 | Thyni | |
| 2012/0067179 A1 | 3/2012 | Ross | |
| 2013/0042731 A1 | 2/2013 | Ross | |
| 2013/0112052 A1 | 5/2013 | Reiche | |
| 2014/0144301 A1 | 5/2014 | Naumann et al. | |
| 2022/0347759 A1 * | 11/2022 | Ross | B23B 5/32 |

FOREIGN PATENT DOCUMENTS

| | | | |
|---|---|---|---|
| EP | 2 303 493 | 4/2011 | |
| JP | 09-108902 A | 4/1997 | |
| JP | 09-295201 A | 11/1997 | |
| KR | 970008073 B1 | 5/1997 | |
| RU | 2244609 C1 | 1/2005 | |
| WO | WO-2004/085100 A2 | 10/2004 | |
| WO | WO-2008/061937 A2 | 5/2008 | |
| WO | WO-2010/006039 A2 | 1/2010 | |
| WO | WO-2019096971 A1 * | 5/2019 | B23B 5/32 |

OTHER PUBLICATIONS

International Search Report and Written Opinion for International Application No. PCT/US09/49921, dated Feb. 22, 2010, 7 pages.
Promotional materials for a portable wheel lathe of a type understood to be commercially available from Independent Machine Company; printed from website http://www.imc-info.com/ironhorselathes.html; Oct. 13, 2008; 2 pages.

* cited by examiner

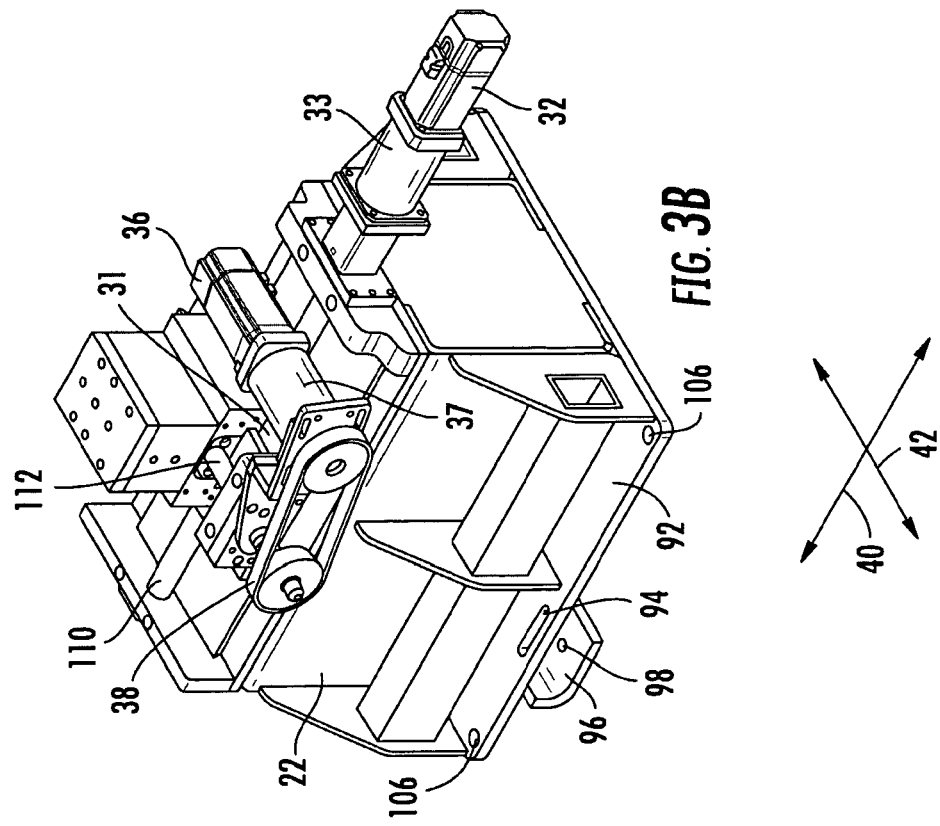
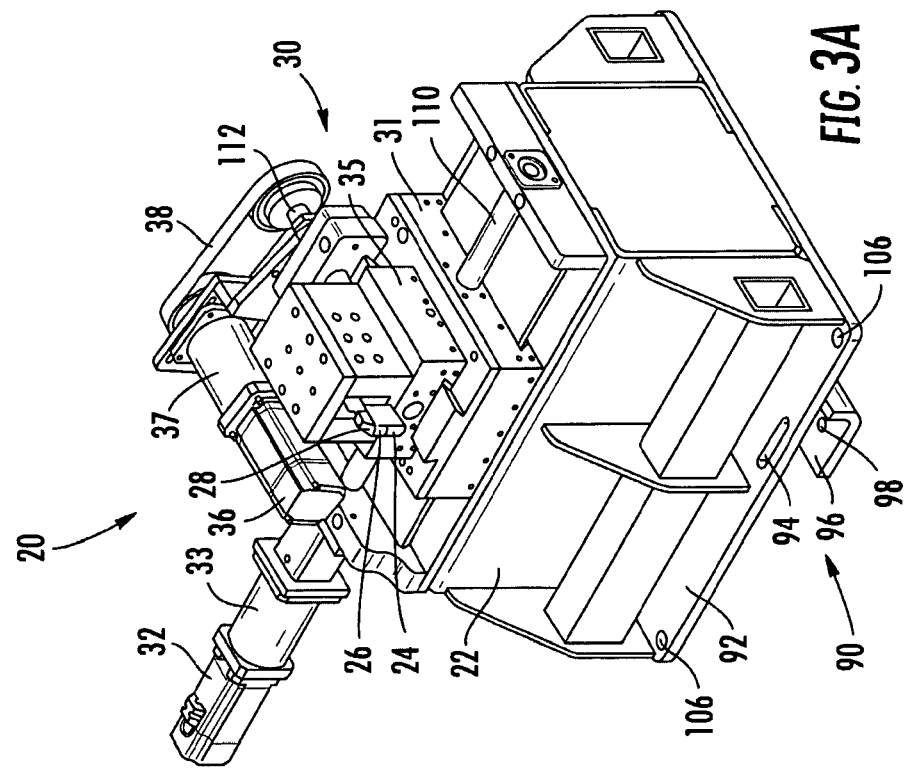

PORTABLE PROFILER FOR LOCOMOTIVE OR RAILCAR WHEELS

CROSS-REFERENCE TO RELATED APPLICATION

The present application claims priority to and is a continuation of U.S. application Ser. No. 16/273,936 entitled "PORTABLE PROFILER FOR LOCOMOTIVE OR RAIL CAR WHEELS" filed on Feb. 12, 2019 which is a continuation-in-part of U.S. application Ser. No. 13/745,520, entitled "PORTABLE PROFILER FOR LOCOMOTIVE OR RAIL CAR WHEELS" filed on Jan. 18, 2013, which is a continuation-in-part of U.S. application Ser. No. 13/428,952 (n/k/a U.S. Pat. No. 8,408,105), entitled "PORTABLE PROFILER FOR LOCOMOTIVE OR RAILCAR WHEELS", filed on Mar. 23, 2012, which is a continuation of U.S. application Ser. No. 12/171,151 (n/k/a U.S. Pat. No. 8,186,250), entitled "WHEEL LATHE FOR RAILROAD CARS AND LOCOMOTIVES", filed on Jul. 10, 2008, all of which are incorporated herein by reference in their entireties. U.S. application Ser. No. 13/745,520 is a continuation-in-part of PCT/US2012/036755 which claims priority to provisional Application No. 61/484,562, filed on May 10, 2011; U.S. application Ser. No. 13/745,520 is a continuation-in-part of U.S. application Ser. No. 13/587,740 (n/k/a U.S. Pat. No. 9,358,650), filed Aug. 16, 2012, which claims priority to provisional Application No. 61/524,652, filed on Aug. 17, 2011; and U.S. application Ser. No. 13/745,420 is a continuation-in-part of U.S. application Ser. No. 12/886,418, (n/k/a U.S. Pat. No. 8,789,448), all of which are herein incorporated by reference in their entireties.

FIELD

The present disclosure relates generally to the field of maintenance for railway vehicles. More specifically, the present disclosure relates to an apparatus for machining and maintaining the wheels of a locomotive or railway car.

BACKGROUND OF THE INVENTION

Wheels on railway locomotives and cars are subject to abuse and wear in the course of normal use. This wear changes the contour of the wheel, forming undesirable contours including flats, high flanges and other contours that adversely affect the performance of the wheel. A worn wheel can reduce ride quality, increase the risk of derailments, and contribute to increased wear, fatigue, noise, and excessive fuel consumption.

Locomotive and railcar wheel maintenance is important to safety and efficient operation of railways. Locomotive and railcar wheel maintenance typically involves removing the locomotive or railcar from service and re-profiling or "retruing" the wheel with a lathe mechanism. Such known lathe mechanisms may be provided in pits below removable rail sections. Such mechanisms may be computer numerical control (CNC) machines and are generally large, expensive, and not portable. Stationary mechanisms require establishing a permanent maintenance facility or area and removing the locomotive or railcar from service.

Locomotive and railcar wheels may also be re-profiled with manual lathe mechanisms. However, such manual processes are generally time-consuming and require intense labor, taking as many as 8 hours to re-profile a pair of wheels. In addition, some known processes create a long, continuous chip. A machinist is required to wear safety gear such as heavy leather clothing and a face shield to avoid being injured by the extremely hot, razor sharp chips.

Thus, there is a need for a portable re-profiling system for wheels of locomotives or railcars. Furthermore, there is a need for a lathe mechanism that is more efficient and safer than manual lathe mechanisms. Further still, there is a need for an automated re-profiling system that is quick, efficient and less expensive than conventional systems located in permanent maintenance facilities.

SUMMARY OF THE INVENTION

An exemplary embodiment relates to a portable apparatus for configuring a wheel associated with a track. The apparatus is in a fixed position with respect to a rail associated with the track when in operation. The apparatus includes a tool configured to engage the wheel, a positioning system for positioning the cutting tool in at least two axes, and a computer control. The computer control is coupled to control the positioning system. The positioning system is controlled so that the wheel is configured in accordance with a profile.

Another exemplary embodiment relates to a portable cutting system for profiling a wheel while attached to a rail car or locomotive on a track. The system includes means for attaching the cutting system to the track. The system also includes means for profiling the wheel in accordance with a stored profile in the portable cutting system.

Another exemplary embodiment relates to a portable system for profiling the wheel in accordance with an electronically stored profile. The wheel is associated with a train in the field. The system includes a cutting tool configured to engage the wheel, a positioning system for positioning the cutting tool, and a control for controlling the positioning system. The positioning system is controlled so that the wheel is shaped in accordance with the profile.

BRIEF DESCRIPTION OF THE DRAWINGS

FIGS. 3A and 3B are isometric views of an apparatus for re-profiling a wheel for a railroad car of FIG. 1 according to an exemplary embodiment.

DETAILED DESCRIPTION OF THE PREFERRED EMBODIMENTS

Figure 1:
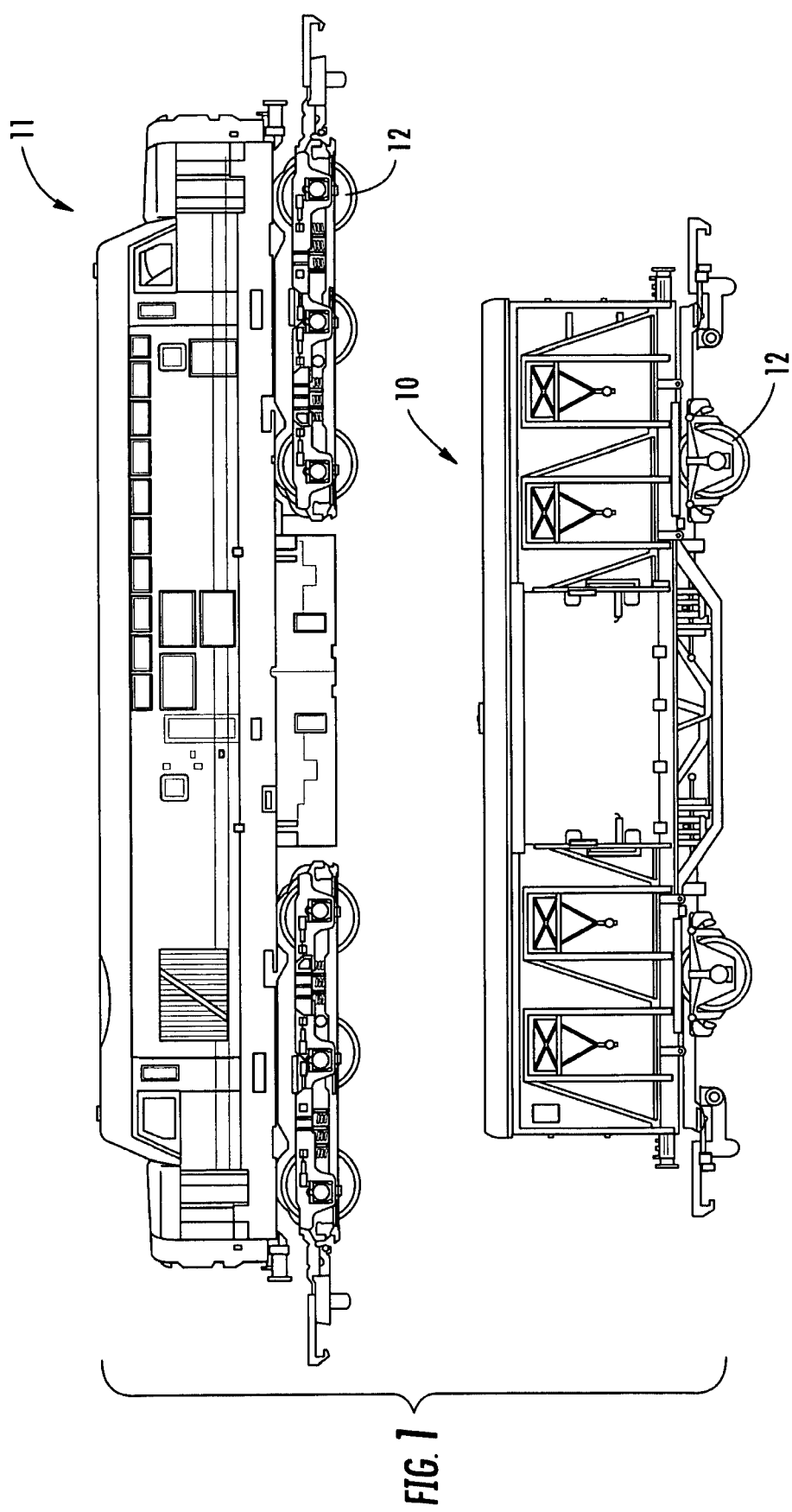
FIG. 1 is an isometric view of a railroad car according to an exemplary embodiment.
Figure 2:
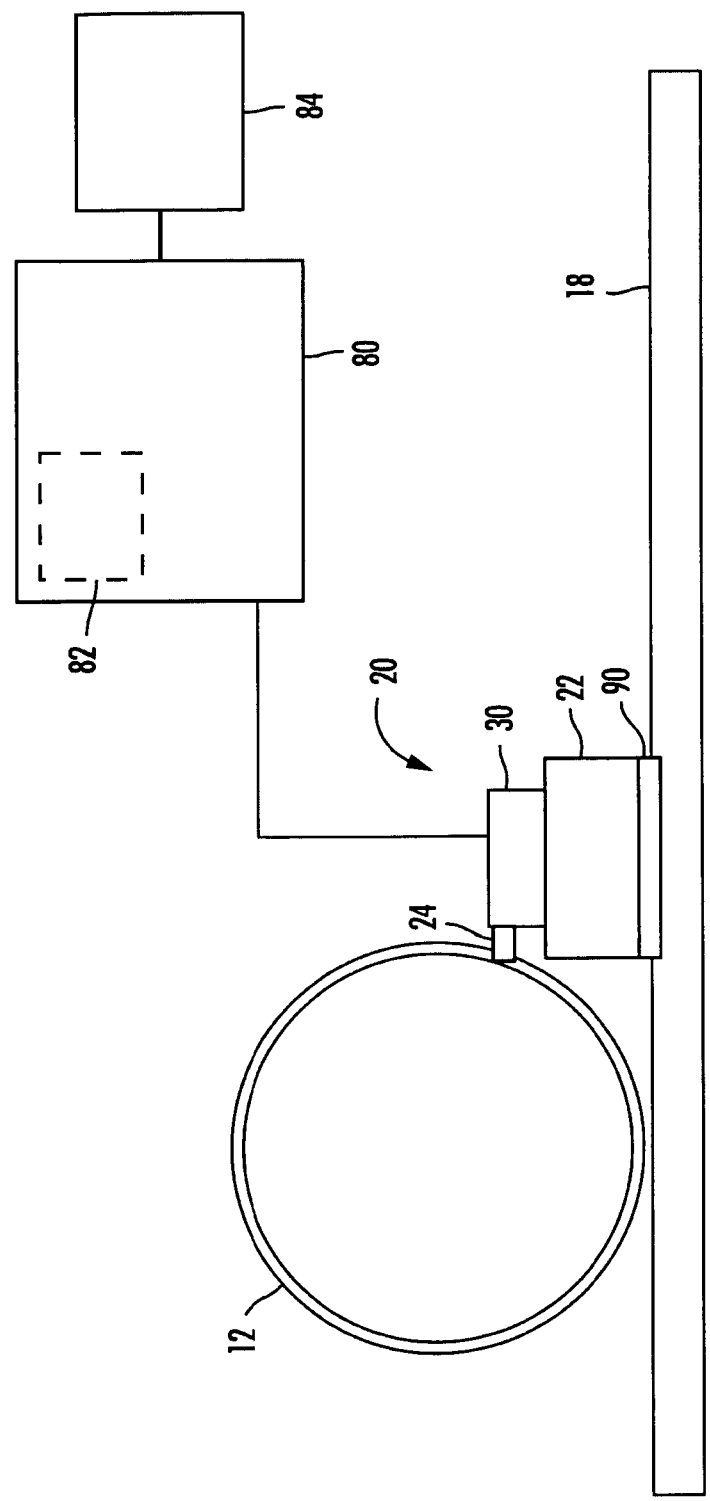
FIG. 2 is a block diagram of an apparatus for re-profiling a wheel for a railroad car of FIG. 1 according to an exemplary embodiment.
Figure 4:
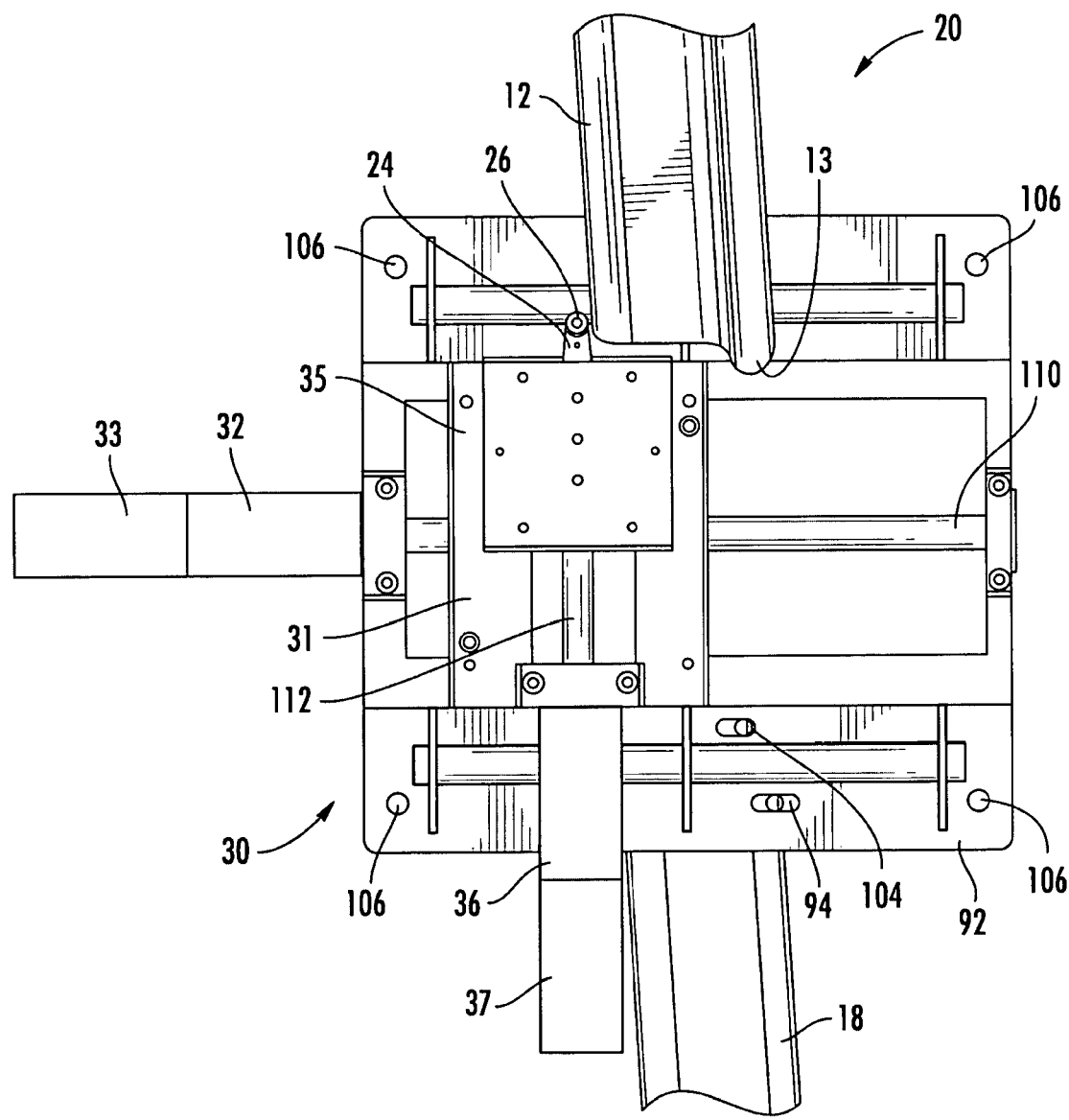
FIG. 4 is top view of the apparatus of FIG. 2 for re-profiling a wheel for a railroad car.

Referring in general to the FIGURES and more specifically to FIGS. 2-4, an apparatus 20 for profiling or re-profiling the wheels 12 of a railcar 10 is shown according to an exemplary embodiment. For the purpose of this specification and the claims, railroad cars include any wheeled systems configured for riding on railroad tracks or rails, including, for example, a locomotive 11 and a railcar 10 shown in FIG. 1. Apparatus 20 is a computer controlled lathe apparatus that is configured to be coupled to tracks 18 upon which locomotive 11 or railcar 10 rides.

Apparatus 20 is a portable lathe device that is configured to be coupled to the track or rail 18 upon which wheels 12 of a railcar 10 are resting. To provide a precise profile for wheel 12 with a relatively short cycle time, apparatus 20 is a computer numerical control (CNC) lathe. The desired profile 82 for wheel 12 and the cutting path needed to provide the profile for wheel 12 is stored in a computer control 80 coupled to apparatus 20. Apparatus 20 includes a cutting tool 24 with an insert 26. A profile for wheel 12 is provided by rotating wheel 12 and moving cutting tool 24 relative to wheel 12 with a 2-axis slide mechanism 30. A user may operate an interface 84 coupled to computer controller 80 to control apparatus 20.

Apparatus 20 is able to be easily moved to a railcar 10 or locomotive 11 anywhere instead of having to move the railcar 10 or locomotive 11 to apparatus 20. While most existing mechanisms can weigh in access of several tons, apparatus 20 weighs approximately 450 lbs. Apparatus 20, for example, may be used to service a railcar 10 or locomotive 11 that is broken down at a location away from a station or service area. According to one exemplary embodiment, apparatus 20 wheels may be coupled to apparatus 20. According to another exemplary embodiment, apparatus 20 may be transported by a vehicle such as a forklift.

Figure 5:
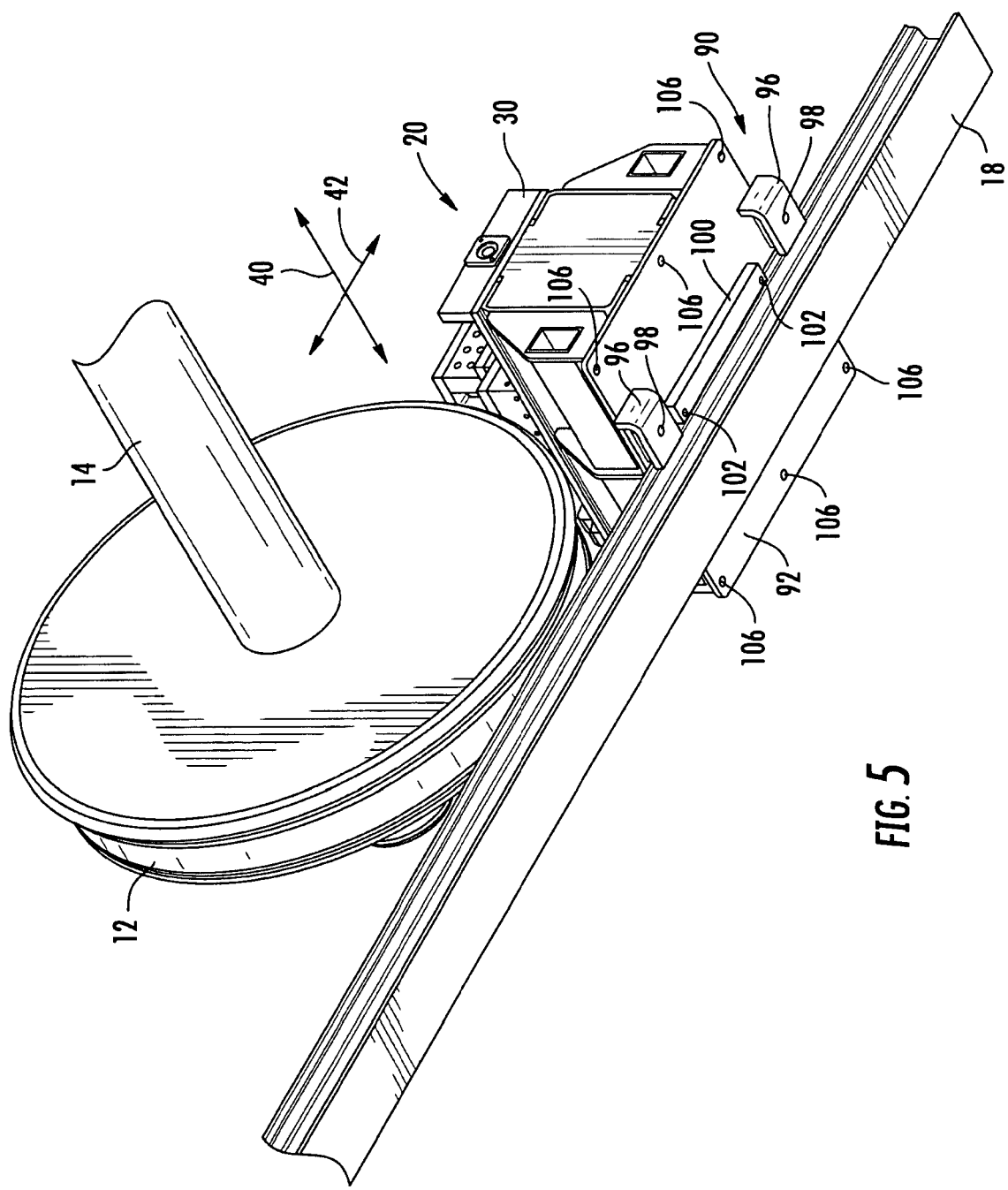
FIG. 5 is a bottom isometric view of the apparatus of FIG. 2, showing a mechanism for coupling the apparatus to a rail.

As shown best in FIG. 5, apparatus 20 is coupled to rail 18 with a mounting mechanism 90. Mounting mechanism 90 rides on the top of a rail 18 aligned with a wheel 12 to be machined. Mounting mechanism 90 is configured to support apparatus 20 such that apparatus is level, firmly coupled to rail 18, and rotated to be aligned with wheel 12. According to an exemplary embodiment, mounting mechanism 90 includes a plate or main body 92, one or more clamps 96, a location bar 100, and a push bar 108.

Location bar 100 is placed along the edge of rail 18 to locate apparatus 20 above rail 18 (e.g., so that the apparatus 20 is approximately aligned with rail 18). Wheels 12 and axle 14 may be configured to rotate slightly about a vertical axis (e.g., to facilitate railcar 10, 11 moving along curved rails). When railcar 10, 11 is elevated from rails 18, wheels 12 and axle may rotate about this horizontal axis. The magnitude and direction of this rotation is generally unpredictable. To compensate for the rotation and to align apparatus 20 with wheel 12, location bar 100 is coupled to plate 92 with a pinned connection (not shown) provided generally in the middle of location bar 100. Location bar 100 includes one or more holes 102, that are aligned with corresponding slots 104 (FIG. 4) in plate 92. Once apparatus 20 is rotated so it is aligned with wheel 12, fasteners passing through holes 102 are tightened to prevent apparatus 20 from rotating about the pinned connection of location bar 100.

Figure 12:
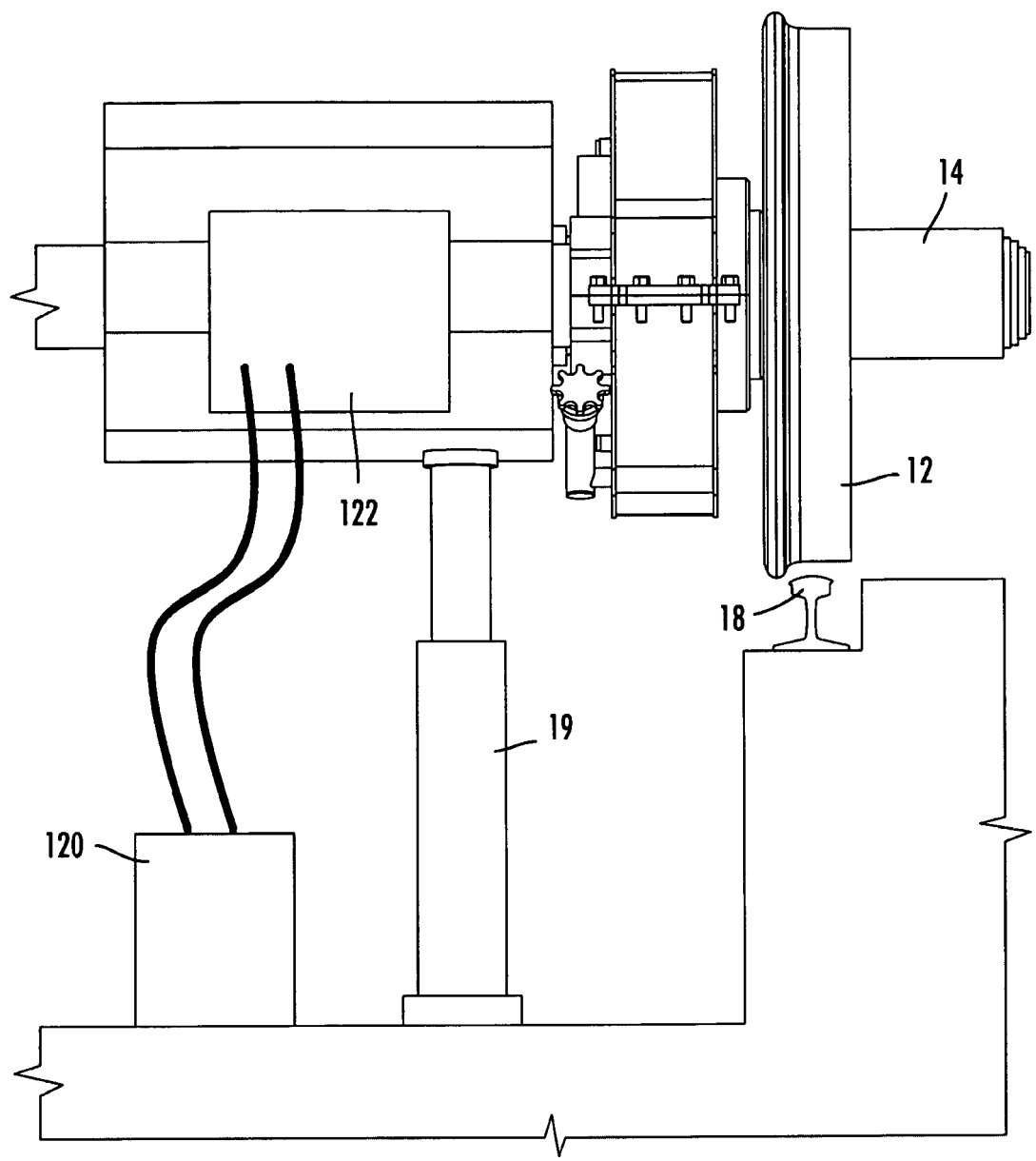
FIG. 12 is a front view of a drive mechanism for an apparatus for re-profiling a wheel for a locomotive according to an exemplary embodiment.

Clamps 96 are movable in a direction generally perpendicular to rail 18. Clamps 96 are coupled to plate 92 by a fastener that passes through a hole 98 in clamp 96 and a corresponding slot 94 in plate 92. According to one exemplary embodiment, clamps 96 are coupled to plate 92 with a bolt that engages a nut. As the bolt is tightened, the head of the bolt and the nut compress clamp 96 against plate 92, preventing clamp 96 from moving relative to plate 92. When apparatus 20 is placed on rail 18, clamps 96 are moved to compress rail 18. A push rod 108 (FIG. 12) is provided to limit the movement of apparatus 20 perpendicular to rail 18. One end of push rod 108 is coupled to apparatus while the opposite end extends to contact the opposite rail 18 (e.g. the rail apparatus 20 is not resting on) or another suitable stationary object.

According to one exemplary embodiment, apparatus 20 is leveled (e.g., so cutting tool 24 moves along a horizontal plane). A multitude of threaded holes 106 are provided about the periphery of plate 92. Holes 106 receive leveling mechanisms such as threaded rods (not shown) with an end that contacts the ground. By turning the leveling mechanisms, they move in a vertical direction relative to plate 92 and move various portions of plate 92 and, in turn, apparatus 20, up or down. According to one exemplary embodiment, holes 106 are provided at each corner of plate 92. According to other exemplary embodiments, holes 106 may be provided elsewhere (e.g., along a side of plate 92).

Figure 8:
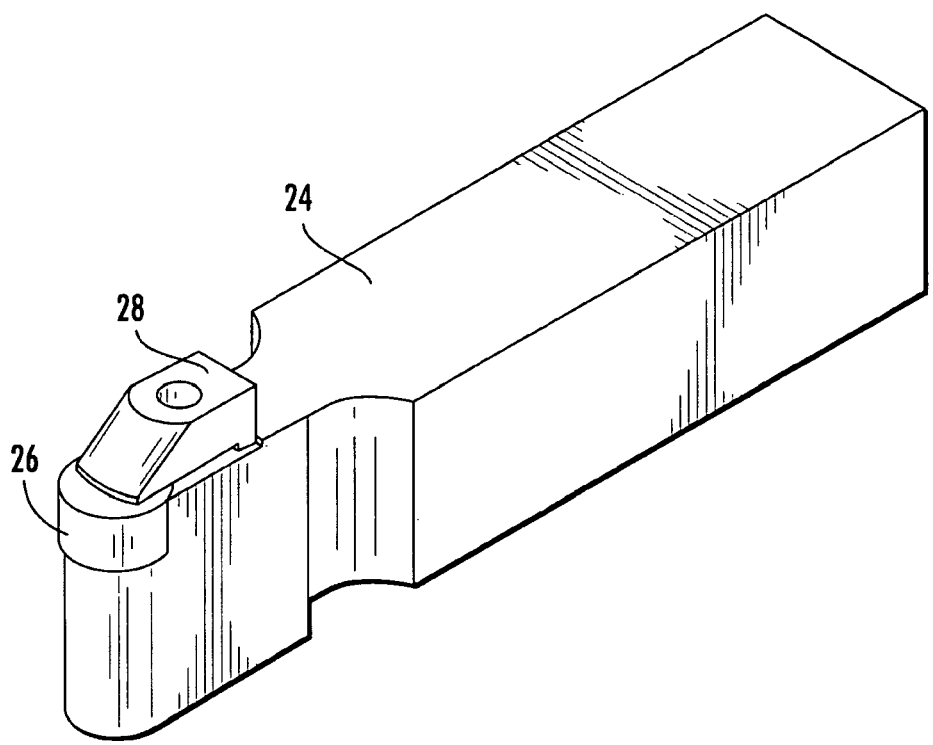
FIG. 8 is an isometric view of a cutting tool for the apparatus of FIG. 2 according to an exemplary embodiment.

As shown best in FIG. 8, cutting tool 24 includes an insert 26 that is secured with an insert clamp 28 (e.g., retainer, holder, etc.). The edges of wheels 12 being profiled may include imbedded sand, stones, and other foreign debris. Cutting tool 24 includes a high-quality cutting tool insert 26 that is able to withstand the wear from the imbedded particles. According to one exemplary embodiment, insert 26 is formed from a tungsten carbide material. According to other exemplary embodiments, insert 26 may be formed from cermet, a coated carbide, a ceramic material, or any other suitable material known in the art. While insert 26 is shown as a generally cylindrical member in FIGS. 3 and 8, according to other exemplary embodiments it may have a wide variety of geometries.

Wheel 12 is turned so cutting tool 24 can profile the entire circumference of wheel 12 with a drive mechanism 50. Drive mechanism 50 includes a base 51, power source such as drive motor 52, a gear reducer 54, and a sprocket 56 coupled to a wheel 12 opposite of the wheel 12 to be profiled (e.g. on the same axle 14). Sprocket 56 is bolted or otherwise coupled to the end of wheel 12 opposite of wheel 12 to be profiled. Because both wheels 12 are mounted on the same solid axle 14, turning one wheel also turns the other. Gear reducer 54 is provided between drive motor 52 and sprocket 56 to reduce the rotational speed to wheel 12 and increase the torque to wheel 12. The output shaft of gear reducer 54 is coupled to sprocket 56 with a chain 58. According to other exemplary embodiments, wheel could be driven by other means (e.g., a motor coupled directly to the wheel, with a roller contacting the edge of the wheel, etc.). According to an exemplary embodiment, wheel 12 is turned at approximately 30-40 revolutions per minute. According to other exemplary embodiments, wheel 12 may be turned a another rate depending on a variety of factors, including the cutting tool material, cutting tool geometry, motor speed, etc. According to one exemplary embodiment, drive motor 52 is a 15 hp AC motor and gear reducer 54 provides a gear reduction ration of 40:1.

Figure 13:
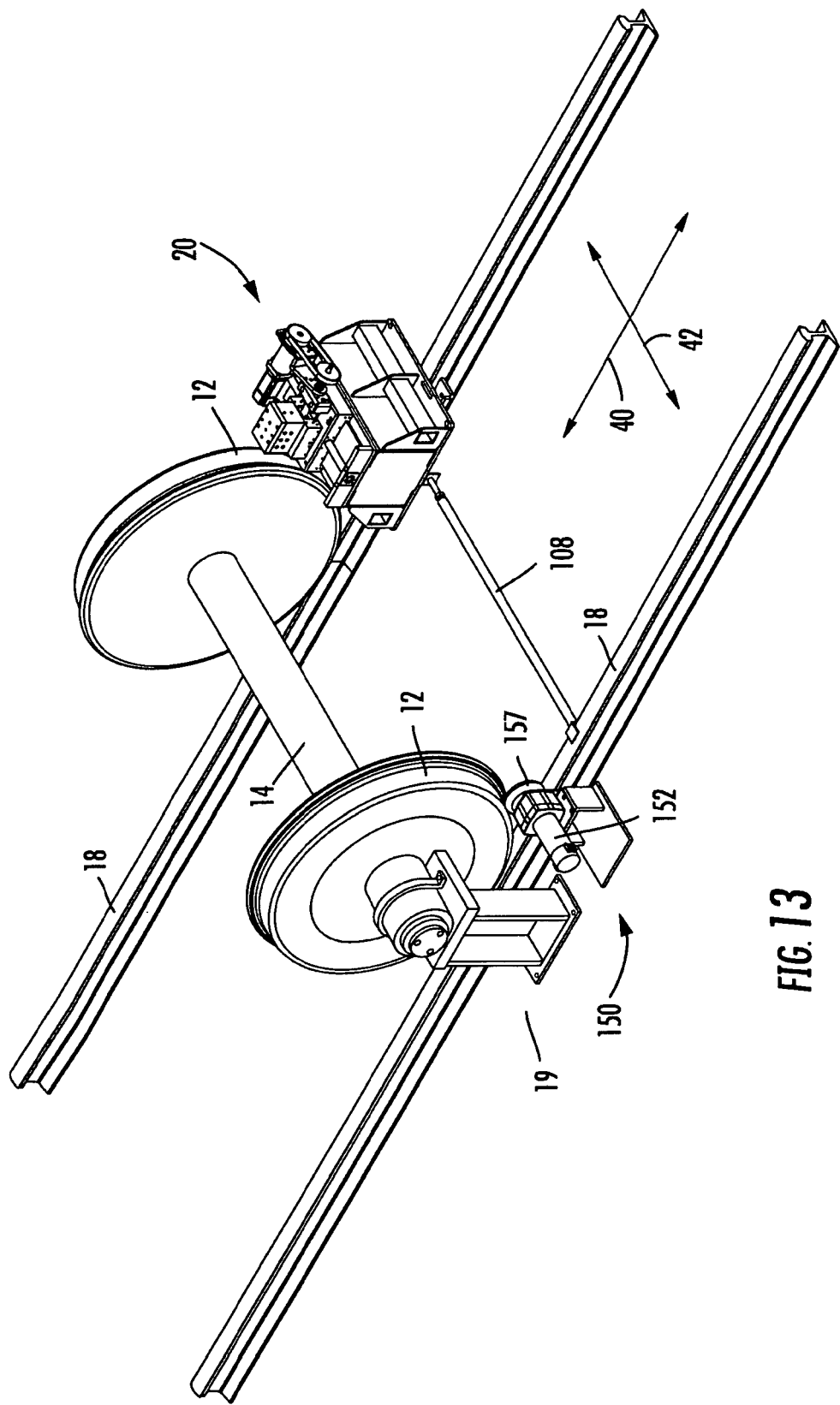
FIGS. 13 and 14 are isometric views of a drive mechanism for an apparatus for re-profiling a wheel for a railroad car according to another exemplary embodiment.
Figure 14:
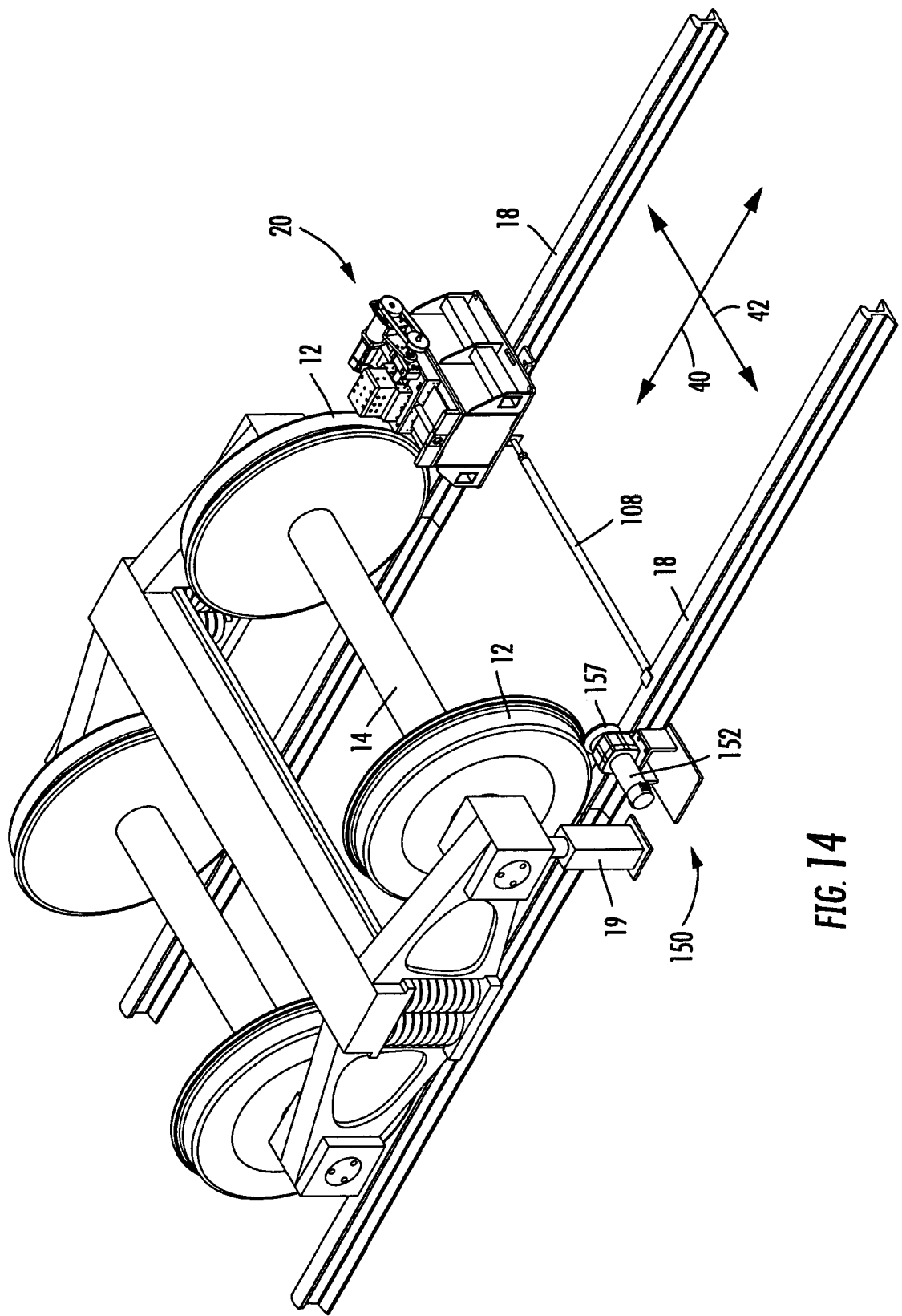

Referring to FIGS. 13 and 14, according to another exemplary embodiment, a drive mechanism 150 uses a friction wheel to turn wheel 12 and axle 14. Drive mechanism 150 is similar to drive mechanism 50, but includes a drive motor 152 that turns a friction wheel such as a roller 157. Roller 157 is compressed against a wheel 12 opposite of the wheel 12 to be profiled (e.g. on the same axle 14). A gear reducer may be provided between drive motor 152 and roller 157. Roller 157 is rotated by motor 152 and, in turn, rotates wheels 12 and axle 14.

Cutting tool 24 is coupled to a slide mechanism 30 that allows cutting tool 24 to be movable relative to wheel 12 along both an x-axis 40 and a y-axis 42. Slide mechanism includes a first slide 31 that moves along x-axis 40, parallel to axle 14, and a second slide 35 that moves along y-axis 42, perpendicular to axle 14. A first power source 32 is provided to move first slide 31. A second power source 36 is provided to move second slide 35. As described above, according to one exemplary embodiment, apparatus 20 is a CNC lathe, and power sources 32 and 36 are electric motors (e.g., servo motors, stepper motors, etc.) that are controlled with signals from a computer controller. Power sources 32 and 36 are coupled to gear reducers 33 and 37, respectively. Gear reducers 33 and 37 reduce the shaft speed and increase the torque from power sources 32 and 36. According to various exemplary embodiments, gear reducers 33 and 37 may be directly coupled to the slide mechanism or may be coupled to the slide mechanism through a transfer mechanism.

As shown according to one exemplary embodiment in FIG. 3, power source 32 and gear reducer 33 are coupled directly to the threaded drive shaft 110 for first slide 31 while power source 36 and gear reducer 37 are coupled to the threaded drive shaft 112 of second slide 35 through transfer mechanism 38. Transfer mechanism 38 may be any mechanism that suitably transfers rotational power, such as a belt and pulley mechanism, a chain and sprocket mechanism, or a gear set. According to an exemplary embodiment, transfer mechanism 38 includes a timing belt (not shown) that engages two pulleys. Transfer mechanisms may be provided to reposition power sources (e.g., to provide a more compact apparatus 20), and/or, to further lower or raise the rotational speed of the drive shafts for slide mechanism 30 (e.g., by providing two differently sized pulleys or sprockets or a reducing gear set). A guard or casing (not shown) may be provided to prevent inadvertent contact between a person or object and the moving components of transfer mechanism 38. According to one exemplary embodiment, power sources 32 and 36 are servo motors and gear reducers 33 and 37 are 20:1 gear reducers. According to other exemplary embodiments, power source 32 and 36 may be a hand wheel with tracer system.

Second slide 35 may be configured to rotate about a vertical axis relative to base 22 and mounting mechanism 90. According to an exemplary embodiment, second slide 35 can be locked at two positions 180 degrees apart to service both wheels 12 on axle 14 while engaging the inside edge of either rail 18 by reorienting mounting mechanism 90 relative to second slide 35.

As cutting tool 24 profiles wheel 12, it may form a chip of removed material. Because apparatus 20 profiles wheel 12 with an automated CNC process, a user does not need to be in close proximity to wheel 12 as it is being machines, reducing the chance of the user being cut by the chip.

Figure 10:
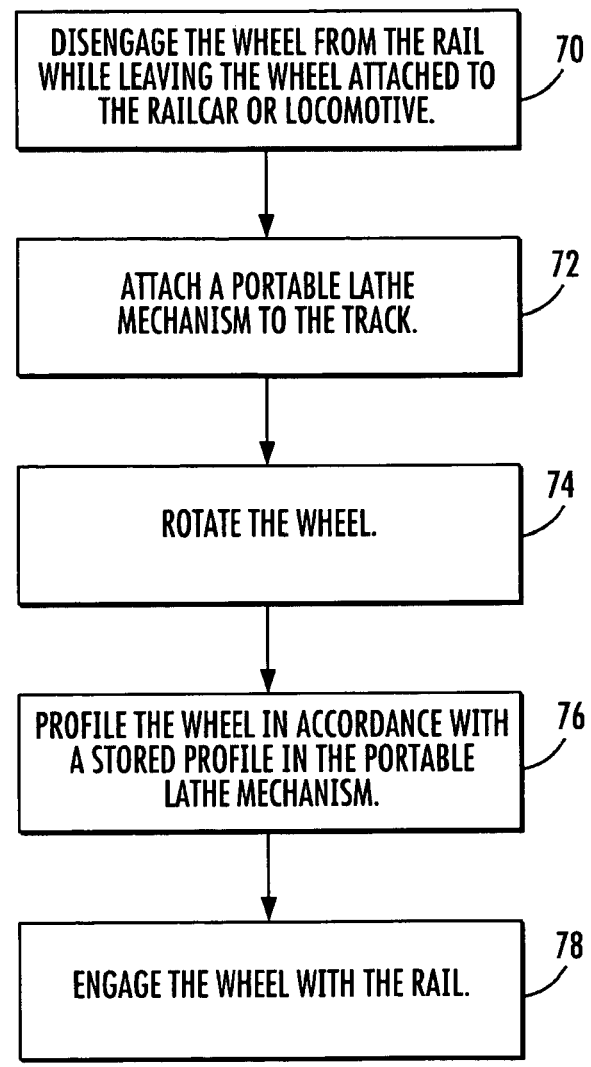
FIG. 10 is a flowchart of a method for profiling a wheel according to an exemplary embodiment.

Referring now to FIG. 10, a method for profiling wheels 12 on a railcar 10 or locomotive 11 involve first disengaging wheels 12 from rails 18 (step 70). According to an exemplary embodiment, a jack or lift 19 (FIG. 12) is used to raise one set of wheels 12 off of rails 18 while leaving the other set of wheels engaged. Wheels 12 and axle 14 are both left coupled to railcar 10 or locomotive 11 to reduce the amount of time needed to profile wheels 12.

Figure 9A:
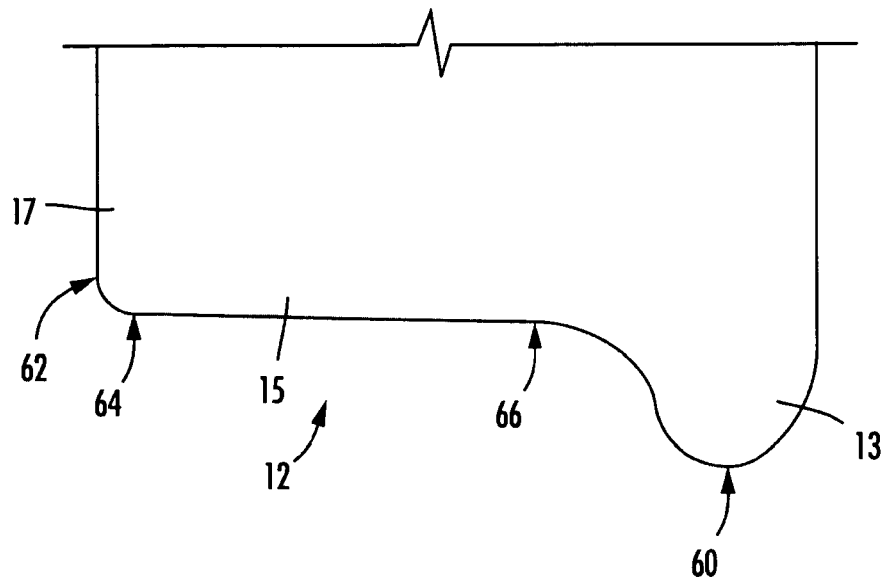
FIGS. 9A-9B are top views of two exemplary wheel profiles for a wheel for the railcar of FIG. 1.
Figure 9B:
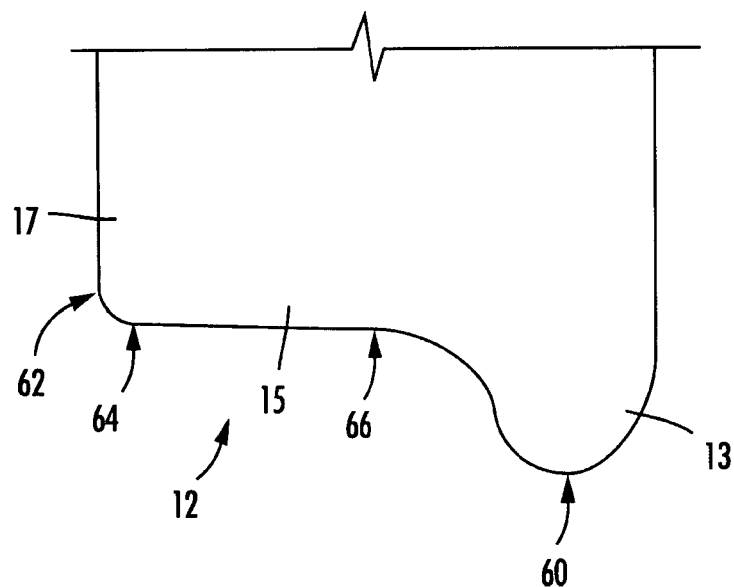

After wheels 12 have been disengaged from rails 18, apparatus 20 is coupled to rails 18 proximate to a wheel 12 with mounting mechanism 90 (step 72). The position of cutting tool 24 relative to wheel 12 is calibrated by first touching cutting tool 24 to wheel 12 at several places and storing those positions in the computer controller. According to one exemplary embodiment, as shown in FIGS. 9A and 9B, cutting tool 24 is touched to wheel 12 at at least two places. A first point 60 is on top of the flange 13 of wheel 12. A second point 62 is on the outside edge or "rim" 17 of wheel 12. A third point 64 and a fourth point 66 are on the two contact points of the "tread" 15.

Figure 6:
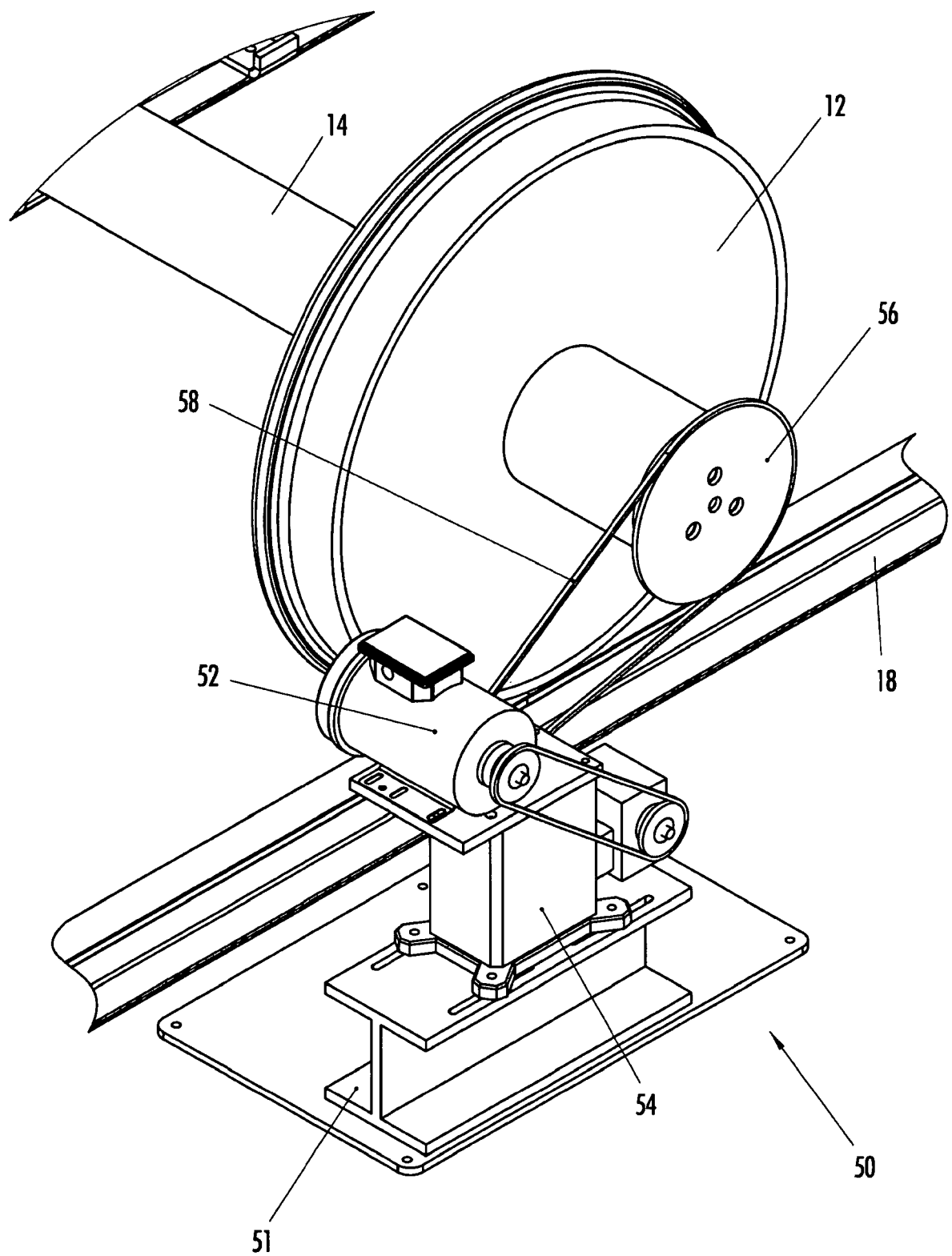
FIGS. 6-7 are isometric views of a drive mechanism for the apparatus of FIG. 2 according to one exemplary embodiment.
Figure 7:
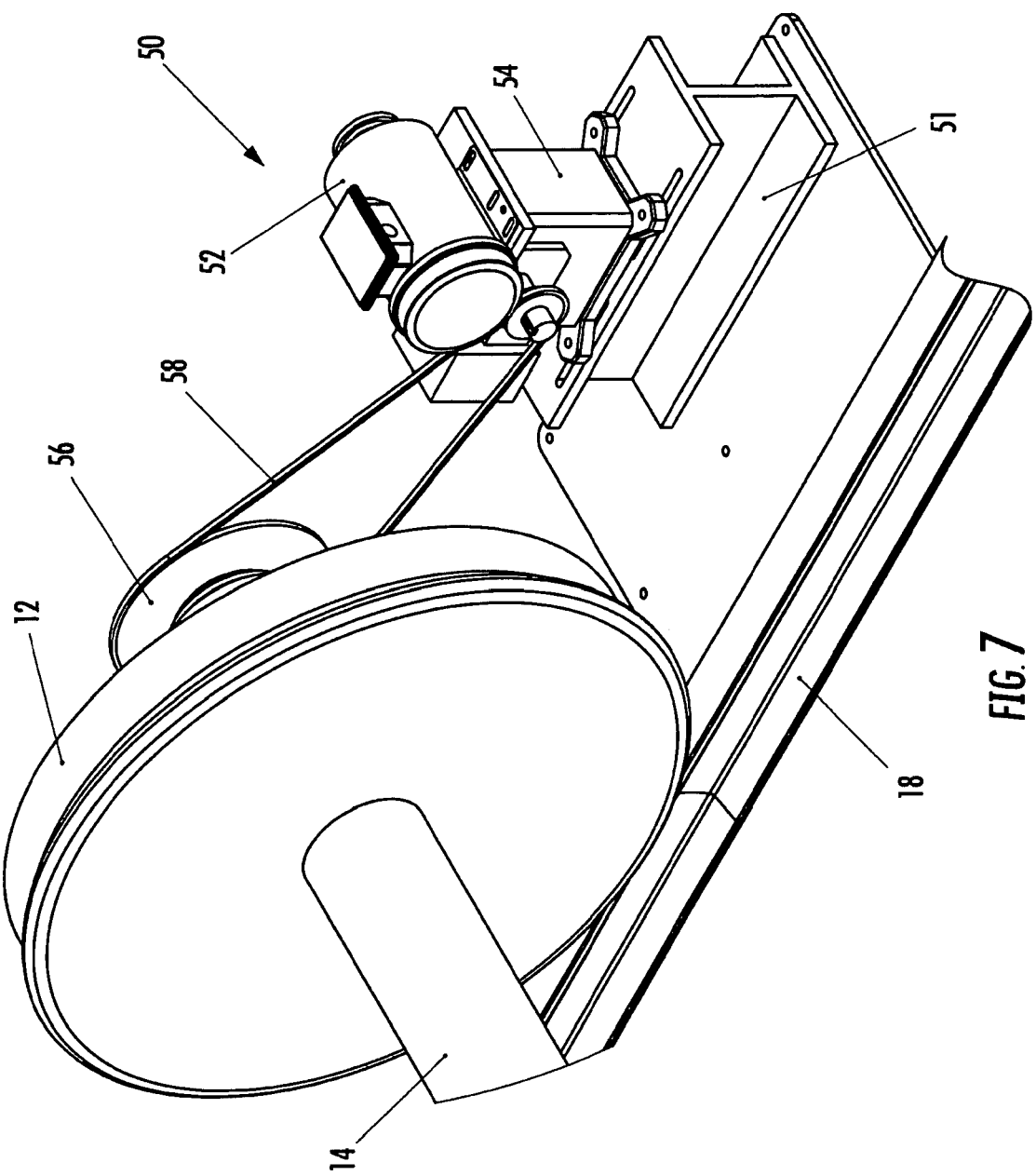

Wheel 12 is rotated so cutting tool 24 can profile the entire circumference of wheel 12 (step 74). If 11 is a locomotive, wheel 12 may be a driving wheel. However, powering the locomotive would cause all the driving wheels on locomotive 11 to turn. To turn only the wheel being profiled by apparatus 20, an external power source is used. According to one exemplary embodiment, shown in FIG. 12, wheel 12 is turned by powering the traction motor 122 with a portable power source 120 such as a DC welder. If railcar 10 is an unpowered car, such as a box car, wheel 12 is turned by a chain and sprocket drive mechanism 50, as shown in FIGS. 6 and 7 or a friction wheel drive mechanism 150, as shown in FIGS. 13 and 14.

With wheel 12 rotating, cutting tool 24 profiles wheel 12 in accordance with a stored profile 82 in the computer controller 80 (step 76). Cutting tool 24 is moved by slide mechanism 35 along x-axis 40 and y-axis 42 with drive motors 32 and 36. According to one exemplary embodiment, apparatus 20 may be used to machine wheel 12 to an AAR-IB regular flange profile (FIG. 9A) or an AAR-IB narrow flange profile (FIG. 9B). According to other exemplary embodiments, the computer controller may provide other paths to apparatus 20 to machine wheel 12 to another profile.

Once wheel 12 has been profiled by apparatus 20, railcar 10 or locomotive 11 is lowered back onto rails 18 (step 78). Railcar 10 or locomotive 11 may then be raised again to profile the other wheels or, if all wheels have been profiled, railcar 10 or locomotive 11 may be returned to service.

Figure 11:
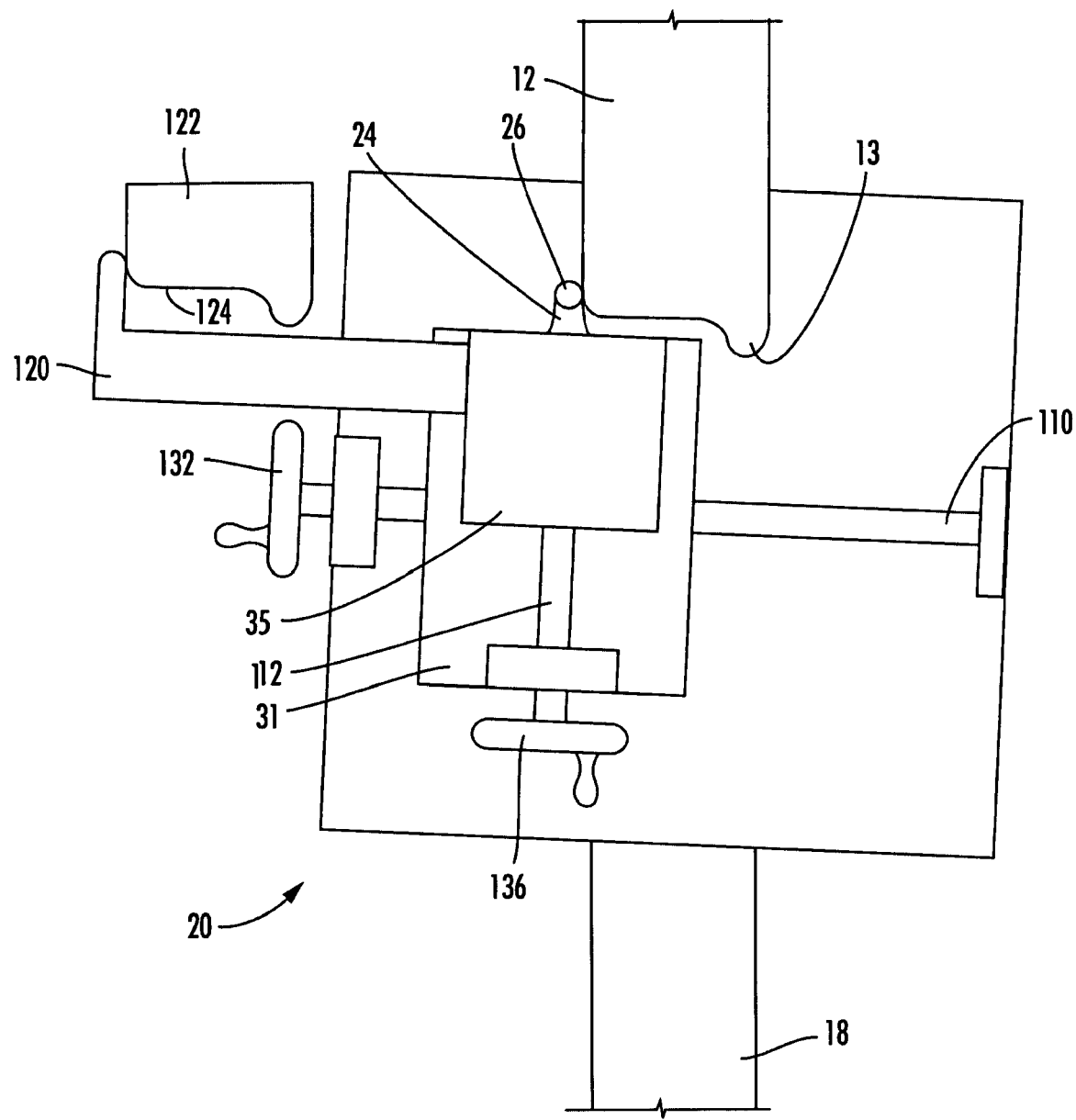
FIG. 11 is a top view of an apparatus for re-profiling a wheel for a railroad car according to another exemplary embodiment.

Referring now to FIG. 11, according to another exemplary embodiment, apparatus 20 used to profile wheel 12 is not a CNC lathe. Instead, a template 122 provides a path for cutting tool 24 of apparatus 20 while an operator moves cutting tool 24 with a manual slide mechanism 130. A hand wheel 132 is turned to move first slide 31 along drive shaft 110 and a second hand wheel 136 is turned to move second slide 35 along drive shaft 112. Template 122 includes a profile 124 that describes a desired profile for wheel 12. Template 122 is positioned relative to wheel 12 such that an arm 120 extending from apparatus 20 contacts template 122 at a position analogous to the position of cutting tool 24 relative to wheel 12. The position of template 122 is calibrated by first touching cutting tool 24 to wheel 12 at several places and positioning template 122 such that arm 120 contacts template 122 at the same places. The calibration points may be similar to the calibration points used to calibrate the CNC process described above or may be different points.

For the purpose of this disclosure, the term "coupled" means the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It is important to note that the construction and arrangement of the wheel lathe as shown in the various exemplary embodiments is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages presented in the present application. Accordingly, all such modifications are intended to be included within the scope of the present disclosure. Other substitutions, modifications, changes and omissions may be made in the design, operating conditions and arrangement of the various exemplary embodiments without departing from the scope of the present disclosure.

What is claimed is:

1. A portable apparatus for profiling a first wheel, the apparatus comprising:
    a base;
    a cutter;
    a positioning system configured to move the cutter relative to the first wheel along at least two axes, the positioning system coupled to the base; and
    a computer control configured to control the positioning system, wherein the positioning system is controlled so that the first wheel is profiled to a desired profile, wherein the first wheel is free to spin without contact with the portable apparatus except at the cutter, wherein the computer control, the base, the positioning system and the cutter are disposed below a center point of the first wheel and above a bottom of a first rail associated with the first wheel, the base being attached to the first rail.

2. The apparatus of claim 1, further comprising an interface for attaching the base to the first rail, the interface comprising a push rod in contact with a second rail.

3. The apparatus of claim 2, wherein the cutter engages the first wheel.

4. The apparatus of claim 1, wherein the two axes comprise a first axis parallel to an axle of the first wheel, and a second axis perpendicular to the axle.

5. The apparatus of claim 1, further comprising a motor system comprising one or more gear reducers coupled to a second wheel on a same axle as the first wheel, the one or more gear reducers configured to reduce rotational speed and increase torque to the second wheel.

6. The apparatus of claim 1 wherein the positioning system is configured to calibrate a position of the cutter by moving the cutter to a plurality of positions to touch a plurality of places of the first wheel, and wherein the computer control is configured to store the plurality of positions.

7. The apparatus of claim 6 wherein the plurality of positions comprise at least one of a top of a flange of the first wheel, an outer edge of the first wheel, a first contact point and a second contact point on a tread of the first wheel.

8. The apparatus of claim 1 wherein the cutter is a high grade carbide lathe cutting tool.

9. The apparatus of claim 8, further comprising: a motor for driving a second wheel on a same axle as the first wheel.

10. The apparatus of claim 9, wherein the motor is configured to drive the second wheel via a bolt and sprocket or via a friction drive.

11. A system configured to profile a first wheel of a first pair of wheels mounted on an axle and disposed on a track with a first rail and a second rail in accordance with an electronically stored profile, wherein the first wheel is raised while allowing one or more second pairs of wheels to engage the track, the system comprising:
    a cutting tool disposed on the track and configured to engage the first wheel;
    a positioning system configured to position the cutting tool; and
    a control configured to control the positioning system, wherein the positioning system is controlled so that the first wheel is profiled to the electronically stored profile, wherein the cutting tool and the positioning system are disposed between a line parallel to the first rail and through a center point of the first wheel.

12. The system of claim 11 wherein the control is a computer controller and the profile is electronically stored in memory.

13. The system of claim 11 wherein the positioning system is coupled to a mounting mechanism for engaging the track associated with a train.

14. The system of claim 12 wherein the cutting tool includes an insert.

15. The system of claim 12 further comprising a location bar for placement along an edge of the track associated with a train.

* * * * *